(12) United States Patent  (10) Patent No.: US 9,180,545 B2
Enyedy  (45) Date of Patent: Nov. 10, 2015

(54) WIRE FEEDER WITH ELECTRODE POWER ROUTING

(75) Inventor: Ed Enyedy, Eastlake, OH (US)

(73) Assignee: Lincoln Global, Inc., City of Industry, CA (US)

(*) Notice: Subject to any disclaimer, the term of this patent is extended or adjusted under 35 U.S.C. 154(b) by 929 days.

(21) Appl. No.: 12/975,206

(22) Filed: Dec. 21, 2010

(65) Prior Publication Data

US 2012/0152920 A1 Jun. 21, 2012

(51) Int. Cl.
| | |
|---|---|
| B23K 9/10 | (2006.01) |
| B23K 33/00 | (2006.01) |
| B23K 35/30 | (2006.01) |
| B23K 9/00 | (2006.01) |
| B23K 9/12 | (2006.01) |
| B23K 9/095 | (2006.01) |
| B23K 9/133 | (2006.01) |
| B23K 9/173 | (2006.01) |

(52) U.S. Cl.
CPC ............ B23K 9/125 (2013.01); B23K 9/095 (2013.01); B23K 9/1336 (2013.01); B23K 9/173 (2013.01)

(58) Field of Classification Search
CPC .................................................. B23K 9/1068
USPC ............ 219/124.02, 130.31, 130.21, 130.32, 219/130.33, 137
See application file for complete search history.

(56) References Cited

U.S. PATENT DOCUMENTS

| | | | | | |
|---|---|---|---|---|---|
| 1,389,848 | A | * | 9/1921 | Smith | 200/4 |
| 1,452,936 | A | * | 4/1923 | Schuman | 219/72 |
| 2,149,699 | A | * | 3/1939 | James et al. | 335/136 |
| 3,324,379 | A | * | 6/1967 | Mulder | 363/100 |
| 3,337,769 | A | * | 8/1967 | Buchanan | 315/142 |
| 3,391,268 | A | * | 7/1968 | Libby et al. | 219/124.02 |
| 3,475,585 | A | * | 10/1969 | Pierce | 219/130.1 |
| 3,519,786 | A | * | 7/1970 | Roberts | 219/98 |
| 3,549,978 | A | * | 12/1970 | Wendelburg et al. | 363/80 |
| 3,614,377 | A | * | 10/1971 | Stearns et al. | 219/130.33 |
| RE27,245 | E | * | 12/1971 | Buerkel | 307/24 |
| 3,665,147 | A | * | 5/1972 | Schobel et al. | 219/130.1 |
| 3,739,139 | A | * | 6/1973 | Weman | 219/130.21 |
| 3,789,183 | A | * | 1/1974 | Conley | 219/92 |
| 3,934,566 | A | * | 1/1976 | Ward | 123/275 |
| 3,944,785 | A | * | 3/1976 | Eaton-Williams | 392/326 |
| 4,034,212 | A | * | 7/1977 | Paxton | 700/212 |
| 4,063,075 | A | * | 12/1977 | Collom | 700/212 |
| 4,117,304 | A | * | 9/1978 | Wodzinski et al. | 219/130.1 |
| 4,396,823 | A | * | 8/1983 | Nihei et al. | 219/137 PS |
| 4,806,735 | A | * | 2/1989 | Ditschun et al. | 219/130.5 |
| 5,357,076 | A | * | 10/1994 | Blankenship | 219/121.54 |
| 6,852,949 | B2 | * | 2/2005 | Lanouette et al. | 219/130.5 |
| 6,940,040 | B2 | * | 9/2005 | Houston et al. | 219/130.51 |
| 6,956,185 | B2 | * | 10/2005 | Stava | 219/137 PS |
| 7,022,942 | B2 | * | 4/2006 | Stava et al. | 219/137 PS |
| 2001/0000899 | A1 | * | 5/2001 | Stava et al. | 219/137 PS |

(Continued)

OTHER PUBLICATIONS

Power Feed 10M Dual Wire Feeder operator's manual; IM777-B; Mar. 2010.

(Continued)

*Primary Examiner* — Dana Ross
*Assistant Examiner* — Gyounghyun Bae
(74) *Attorney, Agent, or Firm* — Perkins Coie LLP (57) ABSTRACT

An apparatus is provided which is a wire feeder for a welding operation having two or more wire driving devices and a switching device which directs the welding current to the appropriate wire driving device for a welding operation.

22 Claims, 5 Drawing Sheets

(56) References Cited

U.S. PATENT DOCUMENTS

| | | | |
|---|---|---|---|
| 2006/0037952 A1* | 2/2006 | Myers et al. | 219/130.51 |
| 2006/0237409 A1* | 10/2006 | Uecker et al. | 219/130.5 |
| 2008/0149602 A1* | 6/2008 | Lenzner et al. | 219/121.45 |
| 2008/0190900 A1* | 8/2008 | Zhang et al. | 219/121.45 |
| 2008/0203065 A1 | 8/2008 | Feldhausen et al. | |
| 2008/0203067 A1 | 8/2008 | Feldhausen et al. | |
| 2010/0051596 A1 | 3/2010 | Diedrick et al. | |

OTHER PUBLICATIONS

Parts List for LN-9 and LN-9 GMA; brochure dated Jan. 18, 1996.
LN-9 Semiautomatic Wire Feeder operator's manual; IM294-C; Jun. 2010.
Miller 70 Series Constant Speed Wire Feeder brochure; index No. M/3.0; Dec. 2010.
Miller D-74 MPa Plus owner's manual; OM-243 347B; Dec. 2009.
Miller D-74S, D-74D owner's manual; OM-1500-6; May 2005.
Miller D-74S, D-74D CE owner's manual; OM-1500-6; Dec. 2009.
Miller D-74DX CE owner's manual; OM-1500-7; Feb. 2010.
Miller D-75S, D75D owner's manual; OM-228 322A; Jun. 2006.
Miller D-75DX owner's manual; OM-228 345A; Jun. 2006.
Lincoln Electric DH-10 Heads & Controls Boom Mount or Bench Models operator's manual; IM572-D; Aug. 2007.

* cited by examiner

WIRE FEEDER WITH ELECTRODE POWER ROUTING

BACKGROUND OF THE INVENTION

1. Field of the Invention

Devices, systems, and methods consistent with the invention relate to a method and apparatus for routing power to welding electrodes in a wire feeder.

2. Description of the Related Art

Dual wire feeders are known in the welding industry. Dual wire feeders are wire feeders which employ two sets of wire drive mechanisms which are separately coupled to two different welding guns and two different sources of welding consumables. Typically a common control box controls the wire drive mechanisms and connects to the welding power source, which supplies a welding current. Dual wire feeders are typically used in environments where two different types of welding electrodes are frequently needed. By using a dual wire feeder the cost of a separate power source is not needed and the delays from change over from one welding process to another is reduced. As an example, steel metal-inert-gas (MIG) wire may be mounted on one side of the dual feeder and the other side has a flux-cored wire mounted on it for different welding operations. However, a common problem with existing dual wire feeders is that both wire drives share a common voltage such that both wire drives, and subsequently the respective welding guns associated with those drives, are electrically hot at the same time.

BRIEF SUMMARY OF THE INVENTION

An exemplary embodiment of the present invention is a wire feeder having at least two sets of wire drives coupled to at least two different welding guns and wire sources with a switch between the respective wire drive systems to direct the welding current to only one wire drive system at a time.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Figure 1:
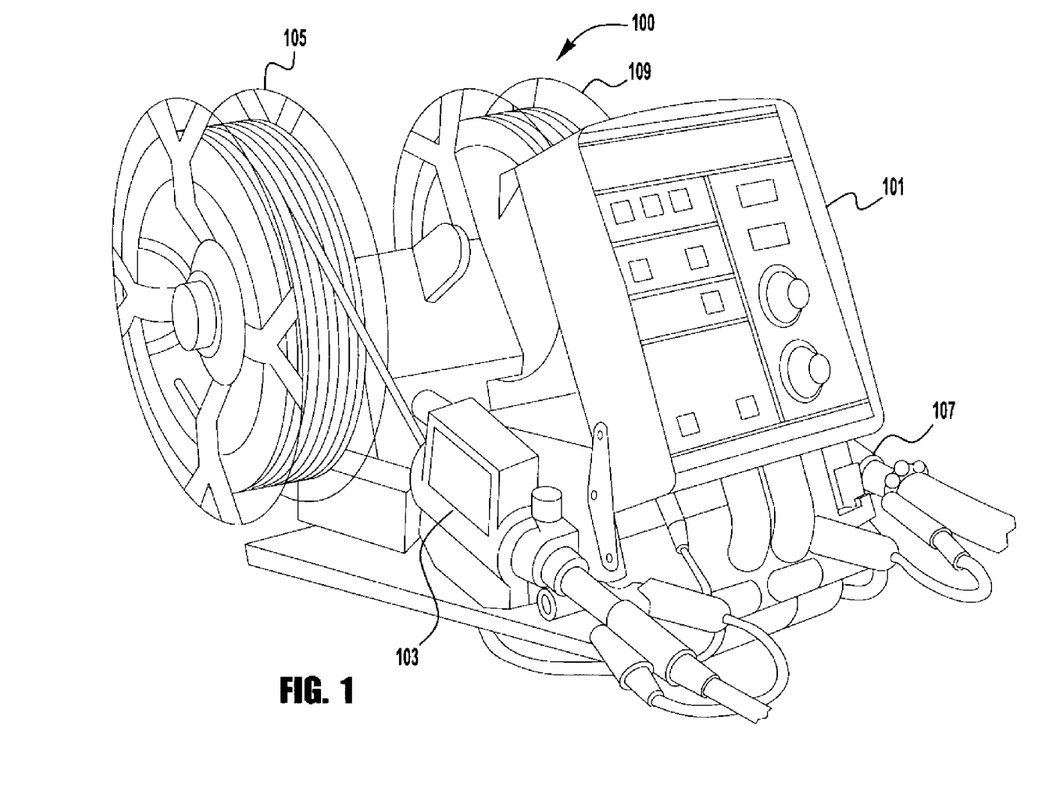
FIG. 1 illustrates a diagrammatical representation of an exemplary embodiment of wire feeder system of the present invention.

Turning now to FIG. 1, an exemplary embodiment of a wire feeder 100 in accordance with an exemplary embodiment of the present invention is shown. The wire feeder 100 depicted is a dual type wire feeder 100 having two separate wire drive systems 103 and 107, a control panel 101 and two separate wire spool mounting structures 105 and 109 (depicted with wire spools thereon). The control panel 101 contains various controls to operate the wire feeder 100. Further, the general structure and operation of the wire drive systems 103 and 107 can be similar to existing wire drive systems.

Although a dual wire feeder configuration is shown as an exemplary embodiment in FIG. 1 (as well as other figures) the present invention is not limited to the use of only two wire drive systems. Specifically, because of the attributes of the present invention, it is contemplated that a wire feeder system in accordance with the present invention can have three or more wire drive systems which can be set up with different welding electrodes and/or for different welding operations. Because the structure and operation of such a system is similar to that of a dual system described below, it is unnecessary to discuss in detail the specific operation of such a system. However, the following discussion related to a dual feeder embodiment is equally applicable to embodiments having three or more wire drive systems.

Figure 2:
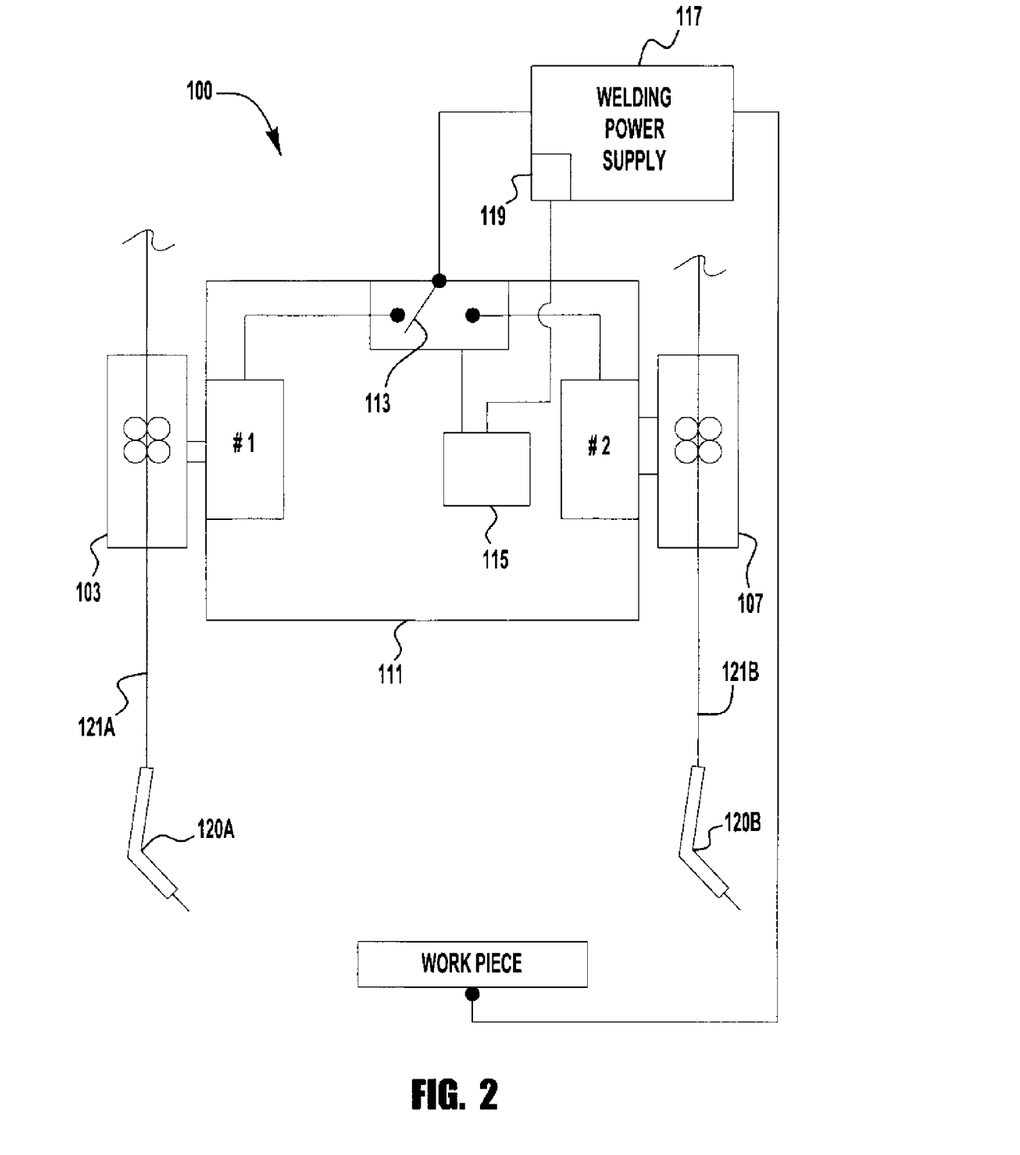
FIG. 2 illustrates a diagrammatical schematic representation of an exemplary embodiment of a wire feeder system of the present invention.

Turning now to FIGS. 1 and 2, during operation the wire feeder 100 obtains its operational power from any one of a welding power supply 117 (which are well known in the art to have auxiliary power outlets), utility power or generator power. This power is employed to operate the wire drive systems 103/107, which typically comprise at least one motor and drive rollers. Because wire drive systems of the type used on dual or single wire feeder systems are generally known their specific construction and operation will not be discussed in detail herein. However, generally a wire drive system uses at least one motor and drive rollers to pull a welding electrode from an electrode source, such as spools (as shown in FIG. 1) and direct that electrode to a welding device/gun 120A/120B to perform a welding operation on a work piece. Although the term welding device or gun is used throughout this application, this is intended to include all types of welding torches.

It is noted that although the welding devices 120A and 120B are depicted as semi-automatic welding guns, the present invention is not limited to this embodiment. Specifically, any known welding devices/torches, including those used in robotic or automatic welding operations, can be coupled to the wire feeder.

The wire drive systems 103/107 and control panel 101 allow for the wire feed speed and/or roller configuration to be adjusted by a user so that the appropriate welding electrode and weld parameters were used during a welding operation. If a user wanted to perform a first welding operation the user would use the welding gun 120A associated with a first welding electrode 121A and first wire drive device 103 and then when the user wants to perform a second welding operation the user would use the second welding gun 120B associated with a second electrode 121B and wire drive system 107. To reduce costs the wire feeder 100 is electrically coupled to a single welding power source 117 which is capable of providing welding power for different types of welding operations. Thus, for a first welding operation, which requires the use of the electrode 121A associated with the first wire drive device 103, the welding power supply 117 provides a first welding current or waveform to the wire feeder 100. This welding power/current is directed to the first wire drive device 103 and ultimately to the first welding gun 120A and into the first electrode 121A for welding. Then for a second welding operation, typically requiring a different type of welding electrode, the power supply 117 provides a second welding current/waveform to the wire feeder 100 which is directed to the second wire feeding device 107 and ultimately the second welding gun 120B and second electrode 121B for a second type of welding operation.

With prior dual wire feeder systems the welding current/waveform from the welding power supply 117 was directed to both wire drive devices 103/107 at the same time. Thus, if the welding current was intended for the first welding operation (using the first wire drive mechanism 103, welding gun 120A and electrode 121A) it was also equally directed to the second wire drive device 107 and its associated electronics. Thus, even though only one welding operation can occur at a time, both wire drive devices 103/107 were electrically "hot." That is, both sides of the wire feeder 100 were receiving the same welding current, resulting in both welding guns 120A and 120B having this welding current and being "hot". That is, in these prior systems both wire drive devices 103/107 are electrically tied to a common electrode voltage. This causes safety and other operational problems.

In exemplary embodiments of the present invention, the wire feeder 100 contains a switching mechanism 113 which directs the welding current/waveform from the power supply 117 to the appropriate wire drive device and welding gun, while electrically isolating the remaining unused wire drive devices. For example, if the first welding operation is to be performed the switch 113 directs the welding power from the power supply 117 to the first wire drive device 103 and gun 120A and preventing the welding power from going to the second wire drive device 107 and welding gun 120B. This ensures that the second gun 120B is not electrically hot and does not pose a safety hazard. Then, when the second welding operation is to be performed the switch 113 is activated to provide the welding power to the second wire drive device 107 and welding gun 120B resulting in the isolation of the first wire drive device 103.

In another exemplary embodiment the switch 113 has a "neutral" position in which the switch 113 is open to each of the wire drive devices 103/107. In such an embodiment the neutral positioning of the switch 113 increases the safety of the wire feeder 100 by preventing inadvertent injury if the power supply is left on or is malfunctioning in some way.

In embodiments of the present invention, the welding current/waveform maybe directed through the switch directly to the welding devices/guns 120A/120B or through the wire drive devices 103/107. The present invention is not specifically limited in this regard. Specifically, it is contemplated that it is not necessary to deliver the welding current/waveform through either of the wire drive devices 103/107 to their respective welding devices 120A/120B, respectively. Thus, in an embodiment of the present invention, the delivery of the welding current/waveform to the welding devices via the switch 113 is not necessarily though the wire drive mechanisms 103/107, so long as the switch electrically isolates the welding device/gun 120A/120B not in use.

In exemplary embodiments of the present invention, the switch 113 can be of any known type, including but not limited to a contactor type switch, a motor drive switch, a silicon type switch (such as an IGBT), or any other type of appropriate electrical switches.

In a first exemplary embodiment, the switch 113 can be of a manual switch type in which the user of the wire feeder 100 manually selects the appropriate switch position for the appropriate welding operation to be performed. In such an embodiment the manual control of the switch can be found on the control panel 101 of the wire feeder 100.

In another exemplary embodiment of the present invention, the switch 113 is controlled from the welding power supply 117. For example, as shown in FIG. 2, the switch 113 is coupled to a control circuit 115, which is coupled to the power supply 117. The power supply 117 contains control circuitry 119 which allows a user to control the switch 113 from the power supply. This is advantageous in situations where the power supply 117 is located closer to the user than the wire feeder 100. In such an embodiment, the user can control the switch 113 from via control circuitry 119 on the power supply 117. In one embodiment, a manual switch is located on the power supply 117 which, through the control circuitry 119, controls the switch 113 on the wire feeder 113.

In yet a further embodiment of the present invention, the control circuitry 119 of the power supply automatically activates the switch 113 in the wire feeder 100 based on the welding operation or welding parameters selected on the power supply 117. Specifically, the control circuitry 119 in the power supply 117 is configured such that when the operator selects a specific welding operation or parameter on the power supply 117 the control circuitry 119 automatically determines the proper positioning of the switch 113 and causes the control circuitry 115 in the wire feeder to properly position the switch 113. This embodiment helps to eliminate issues associate with improper manual switching. For example, the welding power supply 117 can have pre-programmed welding programs for specific welding operations, which require specific welding electrodes and wire feed speeds. Then, as the specific welding program or operation is selected at the power supply 117, the control circuitry 119 determines which of the wire drive devices 103/107 in the wire feeder 100 should be active and the switch 113 is positioned accordingly. In an alternative embodiment, it is the control circuitry 115 in the wire feeder 100 which makes the determination.

In another exemplary embodiment, the positioning of the switch is based on a selection of the electrode to be used during the welding operation. For example, it is contemplated that either one of, or both, the power supply 117 and wire feeder 100 have, respectively, input controls for an operator to input or select a welding electrode type (for example, MIG, FCAW, etc.) and the control circuitry 119/115 determines and controls the appropriate positioning of the switch 113 so that the desired electrode is employed. In other exemplary embodiments, other welding parameters which can be set at the power supply 117 are monitored and used to control the positioning of the switch 113. For example, if a user selects a pulse welding operation, or a surface-tension transfer type welding operation, or a standard MIG welding operation, the control circuitry 115 and/or 119 recognizes this selection and determines the appropriate positioning of the switch 113 to select the proper electrode and wire driving device for that welding operation. The present invention is not limited to which parameters are employed by the control circuitry 115/119 to determine the appropriate switch positioning.

Figure 3:
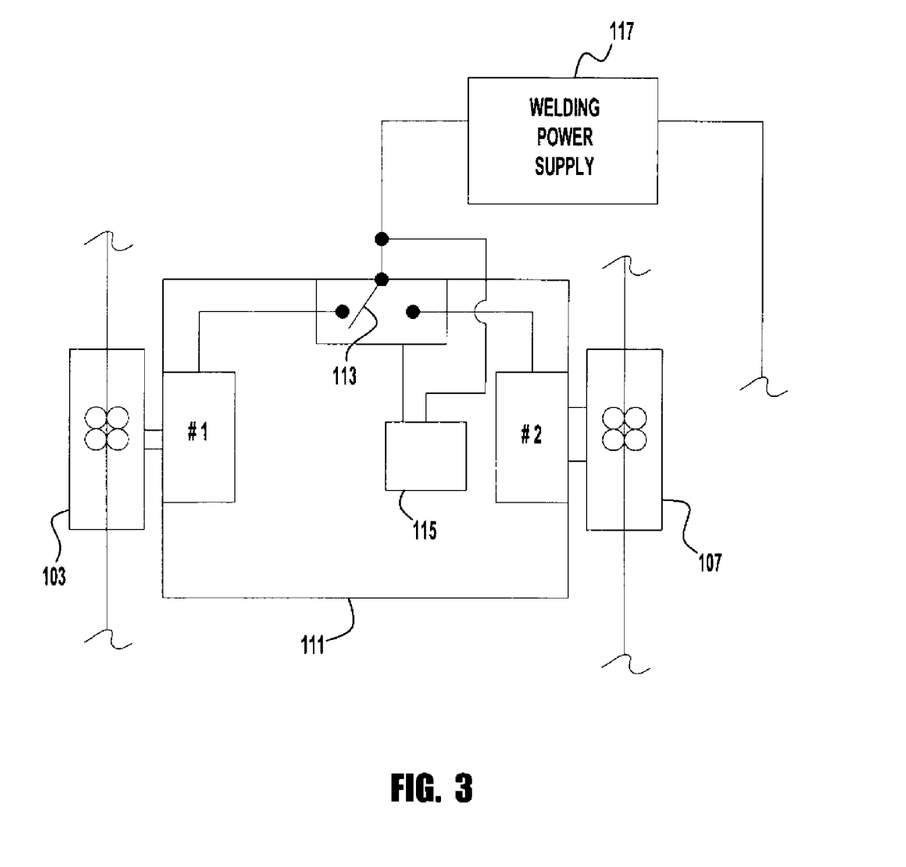
FIG. 3 illustrates a diagrammatical schematic representation of another exemplary embodiment of a wire feeder system of the present invention.

Another exemplary embodiment of the present invention is shown in FIG. 3. In this embodiment, the control circuitry 115 of the wire feeder monitors/detects the welding current/waveform and based on this detection determines the appropriate positioning of the switch 113 so as to direct the welding current to the appropriate wire drive device 103/107. In this embodiment, the control circuitry 115 (which may include a CPU, memory device, and other control circuitry) detects the welding current or welding waveform being sent from the power supply 117 to the wire feeder 100. Based on parameters from the welding signal (which can be current, voltage, pulse frequency, etc.) the control circuitry 115 determines the appropriate switch position. That is, which of the wire drive devices 103/107 are to receive the welding signal.

In a further embodiment of the present invention, the control circuitry of the wire feeder 115 and/or the power supply 117 uses characteristics of the welding current/waveform to confirm if the switch 113 is positioned appropriately, and if the switch is not positioned properly, will not permit the welding operation to begin. For example, in an embodiment with a manual or automatic switching mechanism, the control circuitry 115 of the wire feeder 100 and/or the control circuitry 119 of the power supply 117 monitors/detects a weld parameter set at the power supply 117 or a parameter in the welding current/signal from the power supply 117 and determines an appropriate positioning of the switch 113 which corresponds with the monitored or detected parameter. The control circuitry 115 and/or 119 then detects the positioning of the switch 113 and compares the detected positioning of the switch 113 to the actual positioning of the switch 113. If the positioning of the switch 113 is correct the welding operation continues. If the positioning of the switch 113 is incorrect, the welding operation is prevented from continuing or beginning. In an exemplary embodiment of this aspect of the invention, if an erroneous switch 113 position is detected the control circuitry will cause the switch 113 to move to a neutral position, to prevent any inadvertent welding or injury.

Figure 4:
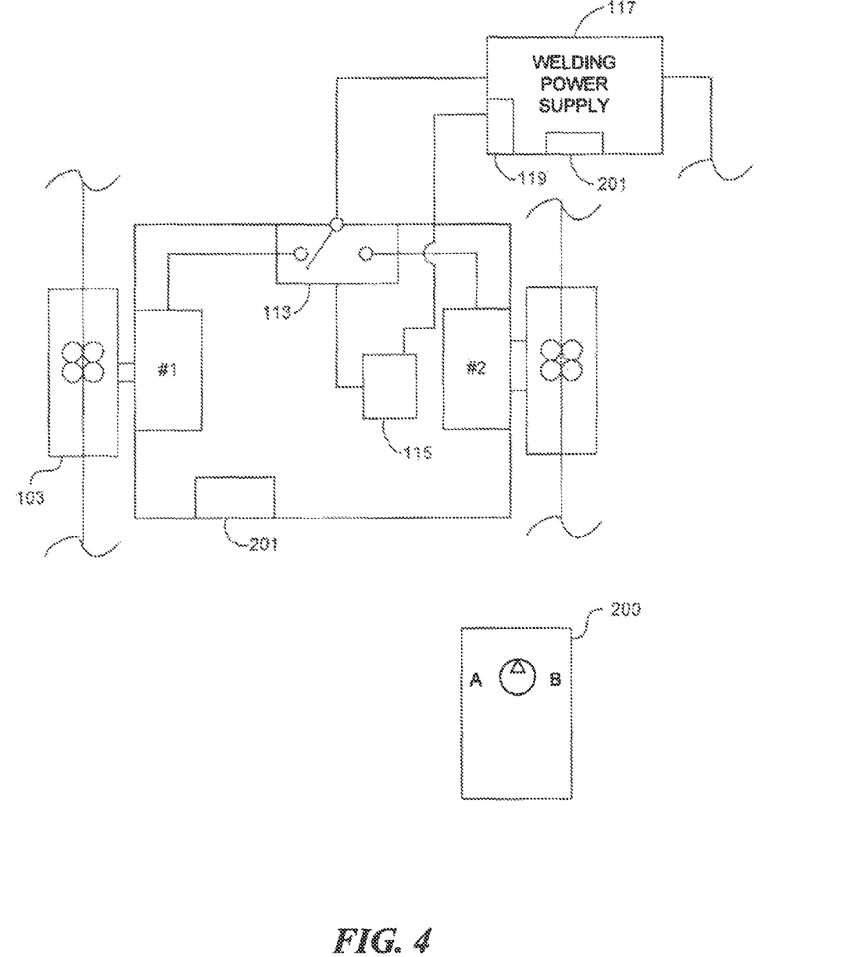
FIG. 4 illustrates a diagrammatical schematic representation of an additional exemplary embodiment of a wire feeder system of the present invention.

In yet a further exemplary embodiment of the present invention, shown in FIG. 4, control of the switch 113 can be effected via the use of a wireless transmitter, such as a pendant device 200 which is capable of transmitting wireless signals to a wireless receiver 201 in either or both of the power supply 117 and the wire feeder 100 to control the switch 113. Further, in yet another exemplary embodiment the power supply may also have a wireless transmitter (not shown) to communicate with the wire feeder 100 and the control circuitry 115 wirelessly. Because the technology of wireless communication is generally known and understood a detailed discussion of this technology will not be included herein. In a further exemplary embodiment the pendant device 200 can be coupled to or incorporated into a welding helmet (not shown). Specifically, it is contemplated that that at least some of the controls of the system can be incorporated into a welding helmet structure employing, for example, wireless communication methodologies to communicate with the control circuitry 115/119 and/or the wireless receiver 201.

In each of the above discussed exemplary embodiments, the use of the switch 113 prevents both wire feeding devices 103/107 and the welding guns 120A/120B from being electrically "hot" at the same time during a welding operation. This is because the welding current/signal is being directed to only one wire feeding device/welding gun at any given time. Moreover, as shown below the control of the switch 113 can be effected in any number of ways, including manual and automatic switching. When using automatic switching any number of various control methodologies can be utilized as discussed above.

In a further exemplary embodiment of the present invention, the switch 113 is prevented from being switched during a welding operation or when there is a minimum amount of current being transmitted from the welding power supply.

Figure 5:
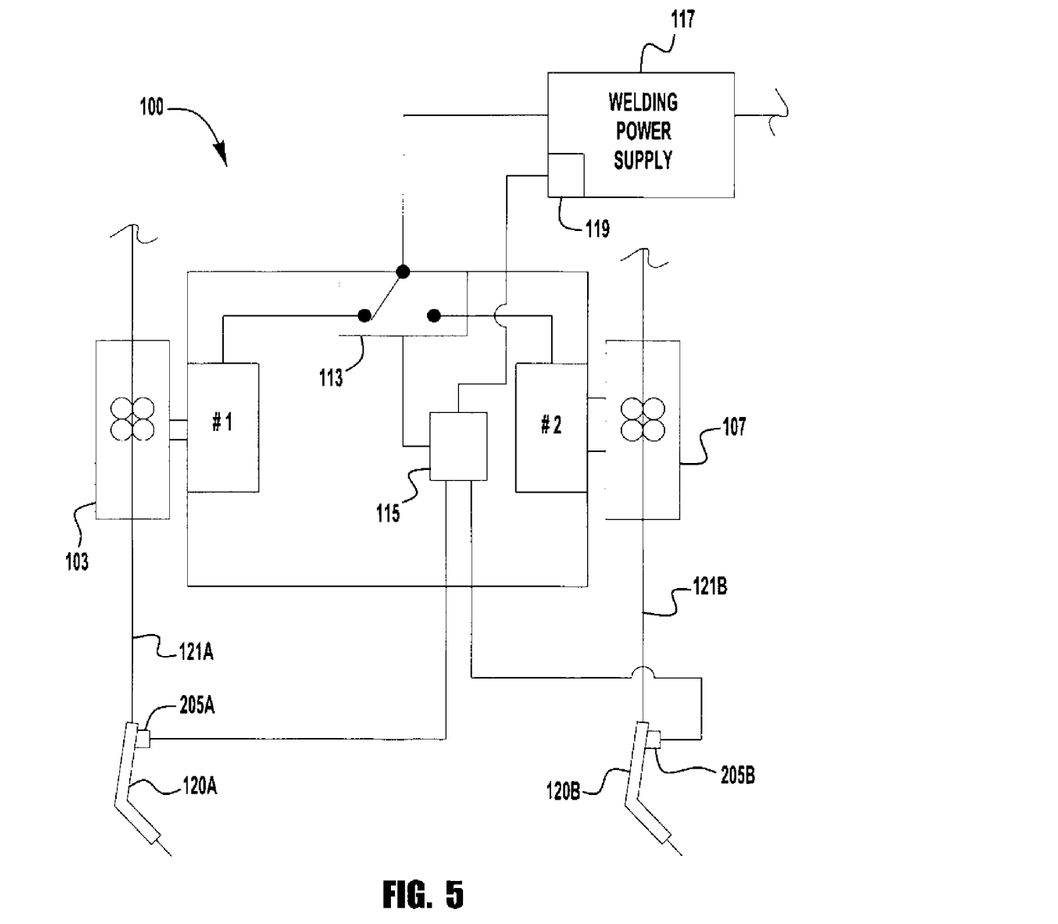
FIG. 5 illustrates a diagrammatical schematic representation of a further exemplary embodiment of a wire feeder system of the present invention.

FIG. 5 depicts yet a further exemplary embodiment of the present invention. In this embodiment, each of the welding guns 120A/120B contains a switch mechanism 205A and 205B, respectively, which is electrically or wirelessly coupled to the control circuitry 115 in the wire feeder 100 and/or the control circuitry 119 in the power supply 119. The switches 205A and 205B may be stand alone switches on the welding guns or may also be electrically coupled to the triggers (not shown) on the welding guns which are activated when the triggers on the guns are activated. In this embodiment, when a user either activates the switch 205A or 205B, or activates the trigger on a respective gun, a signal is sent to the control circuitry 115 which causes the switch 113 to be positioned appropriately for the use of that welding gun. In this embodiment, control of the switch is effectively accomplished remotely at the welding gun. In practice, a user pulls a trigger on the welding gun 120A (or otherwise activates the switch 205A) which causes the control circuit 115 to properly position the switch 113 so that it corresponds to the activated gun. In this embodiment, the user merely activates the switching/trigger on the welding guns to cause the wire feeder 100 to operate the appropriate wire drive device 103/107. In a alternate example of this embodiment, the activation of a trigger or switch 205A/205B is acknowledged by the control circuitry 119 of the power supply 117. The control circuitry 119 then causes the power supply 117 to provide the appropriate welding power/current associated with the activated welding gun. For example, in an embodiment of the invention the control circuitry 119 of the power supply 117 contains at least two different welding programs/operations programmed for welding operations and associates each one of the programs/operations to one of the respective welding guns 120A/120B. When a signal is received by the control circuitry 119 from either the wire feeder 100 (via control circuitry 115) or from one of the respective welding guns 120A/120B the control circuitry 119 causes the power supply 117 to provide the appropriate welding operation. This prevents the user from having to go from the welding workpiece to the power supply 117 to select a new welding operation, but by mere activation of the welding gun, a user can ensure selection of the appropriate welding operation.

For example, an embodiment of the invention is to be used for both a MIG welding operation having a first welding waveform and parameters and flux cored welding having a second welding waveform and parameters which are different from the first set of parameters. A first wire driving device 103 and welding gun 120A is associated with the MIG welding operation, while a second wire driving device 107 and welding gun 120B are associated with the flux-cored welding operation. When a user wishes to perform the MIG welding operation the user selects the appropriate welding gun 120A and activates the trigger or switch 205A. Upon activation of the trigger/switch 205A the control circuitry 119 recognizes that the programmed MIG welding operation is to be performed and causes the power supply 117 to deliver the appropriate MIG welding waveform through the wire feeder 100 and the wire driving device 103 to the gun 120A. Further, as discussed with the many embodiments above, at least one of the control circuitry 115 (wire feeder) and/or control circuitry 119 (power supply) ensures that the switch 113 is positioned appropriately to direct the welding waveform to the wire drive device 103 and welding gun 120A. This embodiment allows for easy and efficient switching from a first welding operation to a second welding operation, while at the same time protecting the user because of the use of the switch 113 in the wire feeder 100. Of course, as with other embodiments of the present invention, this aspect of the invention is not limited to a "dual" feeder configuration, but also includes embodiments having three or more separate wire driving devices and associated components.

Further, as mentioned above, the present invention is not limited to the use of only two wire drive devices, such as in dual wire feeder configurations. It is contemplated that wire feeders employing three or more wire feeding devices can be employed easily with the incorporation of various aspects of the present invention, without departing from the spirit or scope of the invention in any way.

It is noted that the present invention is not limited to the type or manufacture of the power supply 117, but can be used with any known or used welding power supply, including but not limited to TIG, MIG, sub-arc, etc. type welding power supplies.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A wire feeder apparatus, comprising:
a first wire drive system coupled to a first welding device;
a second wire drive system coupled to a second welding device; and
a switching mechanism between said first and second welding devices, said switching mechanism comprising,
an input terminal to receive an output current from a welding power supply,
a first position that selects a first current path, said first current path configured to direct a first welding current from said welding power supply to said first welding device such that said second welding device is electrically isolated from said first welding current,
a second position that selects a second current path, said second current path configured to direct a second welding current from said welding power supply to said second welding device such that said first welding device is electrically isolated from said second welding current, and
a third position that selects neither said first current path nor said second current path; and
a controller that couples to said switching mechanism and to said welding power supply and controls a switching of said switching mechanism.

2. The wire feeder apparatus of claim 1, wherein said controller automatically controls the switching of said switching mechanism between said first and second positions.

3. The wire feeder apparatus of claim 1, wherein said third position prevents either one of said first or second welding current from being directed to either of said first or second welding devices.

4. The wire feeder apparatus of claim 1, wherein at least one of said first and second welding devices is a welding gun.

5. The wire feeder apparatus of claim 1, further comprising a control panel through which the switching mechanism can be controlled by a user.

6. The wire feeder apparatus of claim 1, wherein said first welding device contains a first switch and said second welding device contains a second switch, and wherein when said first switch is activated by a user said switching mechanism switches to said first position and when said second switch is activated said switching mechanism switches to said second position.

7. The wire feeder apparatus of claim 1, further comprising a wireless control device which controls the switching mechanism remotely from said wire feeder apparatus.

8. A wire feeder apparatus, comprising:
a first wire drive system coupled to a first welding device;
a second wire drive system coupled to a second welding device;
a switching mechanism between said first and second welding devices; and
a controller that couples to said switching mechanism and to said welding power supply and controls a switching of said switching mechanism,
wherein said switching mechanism has an input terminal to receive an output from said welding power supply and at least a first position and a second position,
wherein when said switching mechanism is in said first position a first welding current from said welding power supply is directed to said first welding device such that said second welding device is electrically isolated from said first welding current and when said switching mechanism is in said second position a second welding current from said welding power supply is directed to said second welding device such that said first welding device is electrically isolated from said second welding current, and
wherein said controller automatically switches said switching mechanism between said first position and said second position based on said signal from said welding power supply.

9. The wire feeder apparatus of claim 8, wherein said signal is based on a welding parameter.

10. The wire feeder apparatus of claim 8, wherein said first and second welding devices are welding guns.

11. A wire feeder apparatus, comprising:
a first wire drive system for providing a first welding electrode to a first welding device;
a second wire drive system for providing a second welding electrode to a second welding device;
a switching mechanism that operatively connects to a welding power supply to receive a welding current from said welding power supply, said switching mechanism comprising,
a first position that selects a first current path, said first current path directs a first welding current from said welding power supply to said first welding electrode such that said second welding electrode is electrically isolated from said first welding current,
a second position that selects a second current path, said second current path directs a second welding current from said welding power supply to said second welding electrode such that said first welding electrode is electrically isolated from said second welding current, and
a third position in which neither said first current path nor said second current path is selected and which electrically isolates said first welding device and said second welding device from said welding power supply; and
a controller that couples to said switching mechanism and to said welding power supply and controls a switching of said switching mechanism.

12. The wire feeder apparatus of claim 11, wherein said controller automatically controls the switching of said switching mechanism between said first and second positions.

13. The wire feeder apparatus of claim 11, wherein said third position prevents either one of said first or second welding current from being directed to either of said first or second welding electrodes.

14. The wire feeder apparatus of claim 11, wherein at least one of said first and second welding devices is a welding gun.

15. The wire feeder apparatus of claim 11, further comprising a control panel through which the switching mechanism can be controlled by a user.

16. The wire feeder apparatus of claim 11, wherein said first welding device contains a first switch and said second welding device contains a second switch, and wherein when said first switch is activated by a user said switching mechanism switches to said first position and when said second switch is activated said switching mechanism switches to said second position.

17. The wire feeder apparatus of claim 11, further comprising a wireless control device which controls the switching mechanism remotely from said wire feeder apparatus.

18. A wire feeder apparatus, comprising:
a first wire drive system for providing a first welding electrode to a first welding device;
a second wire drive system for providing a second welding electrode to a second welding device;
a switching mechanism which can be coupled to a welding power supply and can receive a welding current from said welding power supply; and
a controller that couples to said switching mechanism and to said welding power supply and controls a switching of said switching mechanism,
wherein said switching mechanism has at least a first position and a second position,
wherein when said switching mechanism is in said first position a first welding current from said welding power supply is directed to said first welding electrode such that said second welding electrode electrically isolated from said first welding current and when said switching mechanism is in said second position a second welding current from said welding power supply is directed to said second welding electrode such that said first welding electrode is electrically isolated from said second welding current, and
wherein said controller automatically switches said switching mechanism between said first position and said second position based on a signal from said welding power supply.

19. The wire feeder apparatus of claim 18, wherein said signal is based on a welding parameter.

20. A method of routing welding current in a wire feeder apparatus, comprising:
providing a first welding electrode to a first welding device coupled to said wire feeder apparatus;
providing a second welding electrode to a second welding device coupled to said wire feeder apparatus;
providing a welding current to a switching mechanism from a welding power supply; and
controlling said switching mechanism which is coupled to said first and said second welding devices and to said welding power supply such that said switching mechanism is switched to a first position for welding with said first welding device and is switched to a second position for welding with said second welding device,
wherein when said switching mechanism is in said first position a first welding waveform from said welding power supply is provided to only said first welding device and when said switching mechanism is in said second position a second welding waveform from said welding power supply is provided to only said second welding device, and
wherein said switching mechanism comprises a third position that selects neither said first welding device nor said second welding device.

21. The method of claim 20, further comprising automatically controlling said switching from one of the said first and second positions to the other of said first and second positions based on a signal from either of said first and second welding devices or from a welding power source.

22. A wire feeder apparatus, comprising:
a first wire drive system coupled to a first welding device;
a second wire drive system coupled to a second welding device;
a switching mechanism that operatively connects a welding power supply to said first welding device and said second welding device, said switching mechanism comprising,
a first position that selects a first current path, which directs a first welding waveform from said welding power supply to said first welding device such that said second welding device is electrically isolated from said first welding waveform,
a second position that selects a second current path, which directs a second welding waveform from said welding power supply to said second welding device such that said first welding device is electrically isolated from said second welding waveform, and
a third position in which neither said first current path nor said second current path is selected and which electrically isolates said first welding device and said second welding device from said welding power supply; and
a controller that couples to said switching mechanism and to said welding power supply and controls a switching of said switching mechanism.

* * * * *